United States Patent
Mittal et al.

(10) Patent No.: US 11,616,796 B2
(45) Date of Patent: Mar. 28, 2023

(54) SYSTEM AND METHOD TO PROTECT RESOURCE ALLOCATION IN STATEFUL CONNECTION MANAGERS

(71) Applicant: Volterra, Inc., Santa Clara, CA (US)

(72) Inventors: Devesh Mittal, Bangalore (IN); Daniel Sela, Petach Tiqva (IL); Naveen Neelakanta, Bangalore (IN); Anand H Krishnan, Bangalore (IN)

(73) Assignee: VOLTERRA, INC., Santa Clara, CA (US)

( * ) Notice: Subject to any disclaimer, the term of this patent is extended or adjusted under 35 U.S.C. 154(b) by 479 days.

(21) Appl. No.: 16/679,785

(22) Filed: Nov. 11, 2019

(65) Prior Publication Data
US 2021/0144161 A1   May 13, 2021

(51) Int. Cl.
*H04L 9/40* (2022.01)
*H04L 47/70* (2022.01)
*H04L 47/28* (2022.01)
*H04L 43/08* (2022.01)
*H04L 61/5007* (2022.01)

(52) U.S. Cl.
CPC .......... *H04L 63/1425* (2013.01); *H04L 43/08* (2013.01); *H04L 47/286* (2013.01); *H04L 47/827* (2013.01); *H04L 61/5007* (2022.05); *H04L 63/1416* (2013.01); *H04L 63/1466* (2013.01)

(58) Field of Classification Search
CPC ... H04L 63/1425; H04L 43/08; H04L 47/286; H04L 47/827; H04L 61/2007; H04L 63/1416; H04L 63/1466; H04L 43/0894; H04L 63/0236; H04L 63/107; H04L 63/1408; H04L 63/1458; H04L 43/0817; H04L 61/2514
See application file for complete search history.

(56) References Cited

U.S. PATENT DOCUMENTS 9,621,577 B2   4/2017   Akein
9,628,509 B2   4/2017   Holloway et al.
(Continued)

OTHER PUBLICATIONS

Hase et al., "An Efficient Way to Prevent Dos/DDos Attack in the Cloud Environment", International Journal of Science and Research, vol. 05, Issue 03, Mar. 2016, pp. 829-832.
(Continued)

*Primary Examiner* — Joe Chacko
(74) *Attorney, Agent, or Firm* — Troutman Pepper Hamilton Sanders LLP (Rochester)

(57) ABSTRACT

A computing system and related method protect a computer network connection manager's resources from attempted resource attacks by extracting SrcIP and TTL values from received data packet headers. Extracted SrcIP and TTL values are analyzed to determine the probability that a received data packet is malicious. If the probability exceeds a specified threshold, resources are denied, and the packet is dropped. If the specified threshold is not exceeded, resources are allocated to the received data packet. The SrcIP reputation score, TTL value frequency, SrcIP frequency, SrcIP geo-location, and resource occupancy may all be used in computing the probability of a malicious data packet. These factors may be weighted and summed to calculate the probability of a malicious data packet.

20 Claims, 5 Drawing Sheets

(56) References Cited

U.S. PATENT DOCUMENTS

| | | | |
|---|---|---|---|
| 10,200,402 B2 | 2/2019 | Radlein et al. | |
| 11,302,215 B2* | 4/2022 | Donovan | H04L 63/1458 |
| 2007/0280114 A1* | 12/2007 | Chao | H04L 43/16 |
| | | | 370/252 |
| 2011/0317566 A1 | 12/2011 | Keeni | |
| 2016/0080398 A1 | 3/2016 | Yablokov | |
| 2019/0158533 A1 | 5/2019 | Holloway et al. | |
| 2020/0389430 A1* | 12/2020 | Di Mattia | H04L 63/105 |

OTHER PUBLICATIONS

Cormode, et al. "An Improved Data Stream Summary: The Count-Min Sketch and its Applications", J. Algorithms.55: 29-38 (2005).

Renjan, et al., "DAbR: Dynamic Attribute-based Reputation scoring for Malicious IP Address Detection", 2018 IEEE.

"IPv4 Address: Structure, Classes and Types" study.com. Aug. 27, 2019 URL:https://www.study.com/academy/lesson/ipv4-address-structure-classes-and-types.html.

Kousiouris "Minimizing the Effect of DoS Attacks on Elastic Cloud-based Applications Based on Application-level Markov Chain Checkpoints", Proceedings of the 4th International Conference on Cloud Computing and Services Science (CLOSER-2014), pp. 622-628, 2014.

Kak, "Lecture 16: TCP/IP Vulnerabilities and DoS Attacks: IP Spoofing, SYN Flooding, and The Shrew DoS Attack", Lecture Notes on "Computer and Network Security", Mar. 7, 2019, Purdue University.

Chouhan, et al., "Packet Monitoring Approach to Prevent DDoS Attack in Cloud Computing", International Journal of Computer Science and Electrical Engineering, vol. 1, Issue 1, 2012.

Mao, "TCP Flow Control and Congestion Control", EECS 489 Computer Networks, http://www.eecs.umich.edu/courses/eecs489/w07, Feb. 5, 2007.

Nilkins, "The Anatomy of a Packet Path (ICMP) from Source to Destination", Pearson IT Certification, Aug. 27, 2019 URL:www.pearsonitcertification.com/articles.aspx?=1804873.

"TTL Expiry Attack Identification and Mitigation", Cisco, Aug. 27, 2019 URL:https://www.cisco.com/c/en/us/about/security-center/ttl-expiry-attack.html.

Manfredi, et al., "Understanding Stateful vs Stateless Communication Strategies for Ad hoc Networks", MobiCom'11, Sep. 19-23, 2011, Las Vegas, NV.

International Search Report for corresponding PCT Application No. PCT/US20/57241, dated Feb. 5, 2020.

IPRP for PCT/US2020/057241, dated May 17, 2022.

* cited by examiner

SYSTEM AND METHOD TO PROTECT RESOURCE ALLOCATION IN STATEFUL CONNECTION MANAGERS

BACKGROUND OF THE INVENTION

Technical Field

This invention relates generally to stateful network connection managers such as stateful firewalls, proxy servers, web servers, and application gateways, and more particularly, to a system and method for protecting such stateful connection managers from a resource attack seeking to deny the connection manager from serving legitimate requests by exhausting its resources.

State of the Art

Network protocols for web browser and servers are generally categorized into two basic types, namely, stateless protocols and stateful protocols. A stateless protocol does not require a server to store information about connections requested by source and destination computers. Two well known examples of a stateless protocol are Internet Protocol (IP) and Hypertext Transfer Protocol (HTTP). Stateless protocols simplify server design because fewer resources are required since the server need not keep track of multiple-link communications or session details. Stateless protocols allow each data packet to travel independently from source to destination without reference to any other data packet. Relevant session data is sent to the destination by the source in such a way that every packet of information transferred can be understood in isolation, without context information from previous packets in the session.

In contrast, when a stateful network protocol is used, a client machine sends a request to the server and awaits a response, if no response is received, then the client machine resends the request until a response is received. File Transfer Protocol (FTP) is a common example of a stateful network protocol. Stateful protocols provide better performance to the client by constantly tracking connection information between the client machine and the destination. However, stateful network protocol places a greater burden on server resources by requiring storage of connection information between the client machine and the destination. A stateful connection manager must dynamically allocate storage to deal with each conversation in progress.

Transmission Control Protocol, or TCP and is a connection-oriented communication protocol used to interconnect network devices on a network. More specifically, the TCP standard defines how to establish and maintain a network conversation by which application programs can exchange data. A TCP connection is established and maintained until the application programs at each end have finished exchanging messages. Messages sent over the Internet are divided into a number of packets. In some cases, such data packets can travel across the Internet over different paths. In that case, data packets can arrive at their destination in a different order compared to the order in which they were sent. The TCP protocol ensures that such packets are assembled in the correct order upon receipt at the destination.

TCP sessions follow stateful network protocol, and connections therefore require a stateful network connection manager, e.g., a firewall, proxy server, web server, application gateway, etc., to save information relative to the connection being made. For example, a stateful connection manager typically maintains a TCP connection table to track the status of source IP addresses and destination IP addresses. Such stateful network connection managers must maintain a set of finite resources necessary for normal operation. These resources are needed for purposes such as a) reassembling packet fragments before delivery to transport/session layers; b) reordering segments before delivery to application layers; c) reassembling application data before delivery to applications; and d) tracking the connections between entities in the network, e.g., by creating and maintaining a TCP connection table. Each established TCP connection, and each out-of-order or fragmented packet or packet segment, occupies at least some of these resources. When one of these resources is fully utilized, it may not be possible to service new connections, maintain ongoing connections, or reassemble/reorder traffic, and service will likely be degraded.

Normally when a client attempts to start a TCP connection to a server, the client and server exchange a series of messages, called a TCP three-way handshake. The client requests a connection by sending a SYN (synchronize) message to the server. The server acknowledges this request by sending SYN-ACK back to the client. The client responds with an ACK, and the connection is established.

Unfortunately, malevolent individuals, organizations, and even government agents, have attempted to effectively disable legitimate Internet web resources by circulating malware over the Internet to mount a resource attack on web servers. Often such resource attacks flood a stateful connection manager with false requests in an attempt to deny the connection manager from serving legitimate requests, simply by exhausting the resources of the stateful connection manager. In some cases, an attacker generates a large amount of traffic that exhausts the bandwidth of the stateful connection manager. In other cases, an attacker generates traffic that will require a lot of processing power on the server, and thereby prevent the server from processing legitimate requests due to the excessive load placed on the server's CPU. In still other cases, an attacker generates traffic that, despite being of relatively low bandwidth, nonetheless occupies large amounts of memory resources (e.g., lists, tables, or buffers) maintained by the stateful connection manager, so new data cannot be inserted.

One type of Denial of Service ("DoS") resource attack is a TCP SYN flood attack, which works as follows. The attacker sends a large number of TCP SYN packets to the target. The attacker may engage in "spoofing", i.e., using fake source IP addresses in these packets to appear as legitimate users. Spoofing makes it more difficult to trace such packets back to the actual attacker. Detection and mitigation of such attacks will be more difficult to detect and/or mitigate because the targeted "victim" is unable to block the attack by simply denying traffic from a single source IP address.

Every time a TCP SYN packet is received, the targeted victim responds with the second packet (SYN-ACK) in the 3-way handshake. It also allocates some resources, such as a TCP control block, that will be used to keep track of the TCP connection. The targeted server then waits for the requesting client to answer with the ACK code. A TCP SYN flood attack works by failing to send the ACK response code expected by the server. If the attacker can generate a great number of TCP SYN requests, then the attacker may be able to occupy a large amount of connection manager resources. Those resources are not freed for some time because the targeted victim is expecting to receive the third packet (ACK) in the 3-way handshake, but the third packet never arrives, either because the malicious client is configured to withhold the ACK code, or because the provided source IP address in the TCP SYN packet is a "spoofed address. In the latter case, the targeted victim server sends the SYN-ACK handshake code to a falsified IP source address which refuses to respond with an ACK code because it never sent such a TCP SYN request in the first place.

As described above, the malicious client can either simply not send the expected ACK code, or provide false source IP addresses which refuse to send an ACK code. The end result is that the resources of the connection manager are kept occupied until a connection timeout is triggered. The targeted victim will eventually "time-out" these partial connections, and thereby recover such resources; however, if the attacker can cause the connection manager's resources to be allocated faster than they are freed-up, the targeted victim will run out of resources and be unable to serve legitimate requests.

There are other types of Denial of Service (DoS) attacks apart from TCP SYN flood attacks. For example, a TCP "out-of-order" packet DoS attack takes advantage of the guarantee that TCP data packets will be re-transmitted by a network router in the proper sequential order. It is not unusual for a network router to receive a series of related data packets out of sequence (e.g., a second segment might be received before the first segment), and when that happens, the received packets are "buffered" (i.e., they are temporarily saved in a buffer memory) until missing segments are received so that they can be placed in the proper order before being re-transmitted by a network router. An attacker might intentionally defer sending a first segment of a data packet having a large number of segments to force the network router to buffer the second, third, and later segments that are sent until the missing first segment is finally received. However, the attacker never sends the first segment, with the purpose of tying up buffer resources within the network router used to store the second, third and later segments.

Historically, different mechanisms have been used in order to prevent stateful connection managers from reaching full resource utilization and denying service due to insufficient resources. Examples of such mechanisms include ageing (timeout), rate-limiters, random early detection and tail-drop.

Ageing, or "timeout", is simply the consideration of how long a partial connection has existed without being completed. If one of the connection manager's resources reaches its maximum capacity, then the connection manager will determine which partial connections are the oldest, and clear them out, so it can accept additional new entries.

Rate-limiters are used to limit the rate of traffic received by the network interface controller (NIC) within a given timeframe. For example, this rate might be measured as the number of data packets received from port 53 in one second. If the maximum number of data packets has been received on a particular port within the measured timeframe, any further traffic received within the given timeframe will be dropped. Of course, rate limiting limits the flow of legitimate traffic as well as the flow of malicious traffic.

Random early detection ("RED"), also known as random early discard or random early drop, is an early form of Active Queue Management ("AQM"). An objective of RED is to maintain an average queue size below a minimum threshold. In this manner, spare queue capacity is maintained to cope with short bursts of traffic. The RED algorithm uses uniform randomization in choosing which arriving packets to drop (or to "mark" when used in conjunction with, e.g., Explicit Congestion Notification—ECN). In this manner, the probability of marking a packet from a particular connection is roughly proportional to that connection's share of the bandwidth through the gateway.

Weighted-Random Early Discard (W-RED) is a Quality of Service ("QoS") class-aware variation of RED. QoS controls and manages network resources by setting priorities for specific types ("classes") of data on the network. W-RED scales the probability of discarding the packet with different weights assigned to different QoS classes. So traffic belonging to a higher priority QoS class will be assigned a scaled down discard probability. However, this technique does not differentiate between malicious vs benign data packets. Accordingly, W-RED penalizes both malicious and benign data packets equally.

When protection methods of the type described above fail, and one or more resources gets of the connection manager become exhausted, then "tail-dropping" occurs. Tail-dropping causes a data packet to be put into a queue, provided that the queue is not already filled. If the queue is already filled, then newly arriving data packets are simply dropped until the queue has enough room to accept incoming traffic. However, such tail-drop queuing approaches have a tendency to penalize bursty traffic flows, and do not remedy the problem of resource exhaustion.

Traditionally, various inspections and rule-matching work must be done to determine the malicious traffic and its source in order to protect the resources, drop the malicious packets and/or remove the connection. Such inspections and rule-matching engines are both time consuming and resource consuming. They rely on a binary classification of benign v. malicious sources which is not always possible, particularly in the case of spoofed identities.

SUMMARY OF THE INVENTION

It is therefore an object of the present invention to provide a method to protect against DoS attacks attempting to exhaust memory resources, e.g., lists, tables or buffers, of stateful connection managers, including firewalls, proxy servers, web servers, application gateways, etc.

Another object of the present invention is to provide such a method wherein malicious and malformed data packets are more likely to be penalized than legitimate data packets.

Still another object of the present invention is to provide such a method which avoids significant burdening of the computing power and/or memory resources of the connection manager in order to function, thereby achieving a minimal performance penalty upon the connection manager.

Yet another object of the present invention is to provide a networked computer system which achieves the aforementioned objects.

Briefly described, and in accordance with various embodiments thereof, a first aspect of the present invention relates to an improved computing system adapted to be coupled to a computing network for receiving incoming data packets, and protecting against DoS attacks that attempt to exhaust the memory resources of stateful network connection managers. The computing system includes extraction logic configured to receive data packets from the network and to extract, from each data packet header, the source IP address value SrcIP and the Time to Live value TTL. The computing system also includes analysis logic configured to analyze the extracted SrcIP and TTL values to determine the probability that a received data packet was initiated by an attacker mounting a resource attack against the computing system. The computing system also includes decision logic that is responsive to the analysis logic to either:

a) allocate resources of the computing system to process the data packet when the probability that the data packet was initiated by an attacker mounting a resource attack against the computing system does not exceed a predetermined threshold; or b) deny allocation of the resources of the computing system to process the data packet when the probability that the data packet was initiated by an attacker mounting a resource attack against the computing system exceeds the predetermined threshold.

In various embodiments of the invention, the analysis logic of the computing system uses the SrcIP value to look up a corresponding reputation score in a SrcIP address reputation database. This reputation score is used by the analysis logic when determining the probability that a received data packet was initiated by an attacker mounting a resource attack against the computing system.

In some embodiments of the invention, the analysis logic of the computing system counts the number of data packets received which have a particular TTL value. The analysis logic may increase the probability that a received data packet was initiated by an attacker mounting a resource attack against the computing system as the number of received data packets having the particular TTL value increases.

In various embodiments of the invention, the analysis logic of the computing system monitors the frequency of data packets received which have a particular SrcIP value. The analysis logic increases the probability that a received data packet was initiated by an attacker mounting a resource attack against the computing system as the frequency of received data packets having the particular SrcIP value increases.

In various embodiments of the present invention, the analysis logic of the computing system uses the SrcIP value to look up a corresponding geo-location from which the received data packet was purportedly sent. The analysis logic increases the probability that a received data packet was initiated by an attacker mounting a resource attack against the computing system when the corresponding geo-location is a country or region from which resource attacks are frequently mounted.

In various embodiments of the invention, the analysis logic of the computing system monitors the amount of resources already allocated for processing received data packets. The analysis logic increases the probability that a received data packet was initiated by an attacker mounting a resource attack against the computing system as the amount of resources already allocated for processing received data packets increases. In at least some embodiments, the analysis logic monitors the amount of resources already allocated for processing received data packets that have a particular TTL value; the analysis logic increases the probability that a received data packet was initiated by an attacker mounting a resource attack against the computing system as the amount of resources already allocated for processing received data packets having the particular TTL value increases. In other embodiments, the analysis logic monitors the amount of resources already allocated for processing received data packets that have a particular SrcIP value; the analysis logic increases the probability that a received data packet was initiated by an attacker mounting a resource attack against the computing system as the amount of resources already allocated for processing received data packets having the particular SrcIP value increases. In still other embodiments, the analysis logic monitors the amount of resources already allocated for processing received data packets that originate from a particular geo-location, and increases the probability that a received data packet was initiated by an attacker mounting a resource attack against the computing system as the amount of resources already allocated for processing received data packets that originated from said geo-location increases.

In various embodiments of the invention, the analysis logic of the computing system performs the following:

a) uses the SrcIP value to look up a corresponding reputation score in a SrcIP address reputation database;

b) counts the number of data packets received which have a particular TTL value, and computes a TTL suspicion score derived from the number of data packets received which have the particular TTL value;

c) monitors the frequency of data packets received which have a particular SrcIP value, and computes an SrcIP suspicion score derived from the frequency of received data packets having the particular SrcIP value;

d) monitors the amount of resources already allocated, and provides a corresponding occupancy count;

e) scales the reputation score, TTL suspicion score, the SrcIP suspicion score, and the occupancy count by weighted scaling factors; and f) sums the scaled reputation score, scaled TTL suspicion score, scaled SrcIP suspicion score, and scaled occupancy count, to provide the probability that a received data packet was initiated by an attacker mounting a resource attack against the computing system.

Another aspect of the present invention relates to a method for protecting a computing system coupled to a computer network from a resource attack by penalizing suspicious data packets without significantly penalizing legitimate data packets. In various embodiments of the invention, the method includes the step of extracting the SrcIP and TTL values from the header of each received data packet. The method also includes the step of analyzing the extracted SrcIP and TTL values to determine the probability that a received data packet was initiated by an attacker mounting a resource attack against the computing system. The method also includes the step of either: a) allocating resources of the computing system to process the data packet when the probability that the data packet was initiated by an attacker mounting a resource attack against the computing system does not exceed a predetermined threshold; or b) denying the allocation of resources of the computing system to process the data packet when the probability that the data packet was initiated by an attacker mounting a resource attack against the computing system exceeds the predetermined threshold.

In some embodiments of the invention, the analyzing step of such method uses the SrcIP value to look up a corresponding reputation score in a SrcIP address reputation database. The reputation score is used when determining the probability that a received data packet was initiated by an attacker mounting a resource attack against the computing system.

In various embodiments of the invention, the analyzing step of such method includes the step of counting the number of data packets received which have a particular TTL value. The analyzing step increases the probability that a received data packet was initiated by an attacker mounting a resource attack against the computing system as the number of received data packets having the particular TTL value increases.

In at least some embodiments, the analyzing step of such method includes the step of monitoring the frequency of data packets received which have a particular SrcIP value. The analyzing step increases the probability that a received data packet was initiated by an attacker mounting a resource attack against the computing system as the frequency of received data packets having the particular SrcIP value increases.

In other embodiments of the invention, the analyzing step of such method includes the step of looking up a geo-location from which the received data packet was purportedly sent as based upon the extracted SrcIP value. The analyzing step may increase the probability that a received data packet was initiated by an attacker mounting a resource attack against the computing system when the corresponding geo-location is a country or region from which resource attacks are frequently mounted.

In various embodiments, the analyzing step of such method includes the step of monitoring the amount of resources already allocated for processing received data packets. The analyzing step increases the probability that a received data packet was initiated by an attacker mounting a resource attack against the computing system as the amount of resources already allocated for processing received data packets increases. In at least some embodiments, the analyzing step of such method includes the step of monitoring the amount of resources already allocated for processing received data packets that have a particular TTL value, and wherein the analyzing step increases the probability that a received data packet was initiated by an attacker mounting a resource attack against the computing system as the amount of resources already allocated for processing received data packets having the particular TTL value increases. In other embodiments, the analyzing step includes the step of monitoring the amount of resources already allocated for processing received data packets that have a particular SrcIP value, and wherein the analyzing step increases the probability that a received data packet was initiated by an attacker mounting a resource attack against the computing system as the amount of resources already allocated for processing received data packets having the particular SrcIP value increases. In still other embodiments, the analyzing step of such method includes the step of monitoring the amount of resources already allocated for processing received data packets that originate from a particular geo-location, and wherein the analyzing step increases the probability that a received data packet was initiated by an attacker mounting a resource attack against the computing system as the amount of resources already allocated for processing received data packets that originated from said geo-location increases.

In some embodiments of the present invention, the analyzing step of such method includes the steps of:

a) using the SrcIP value to look up a corresponding reputation score in a SrcIP address reputation database;

b) counting the number of data packets received which have a particular TTL value, and computing a TTL suspicion score derived from the number of data packets received which have the particular TTL value;

c) monitoring the frequency of data packets received which have a particular SrcIP value, and computing an SrcIP suspicion score derived from the frequency of received data packets having the particular SrcIP value;

d) monitoring the amount of resources already allocated, and providing a corresponding occupancy count;

e) scaling the reputation score, the TTL suspicion score, the SrcIP suspicion score, and the occupancy count, by weighted scaling factors; and f) summing the scaled reputation score, the scaled TTL suspicion score, the scaled SrcIP suspicion score, and the scaled occupancy count, to provide the probability that a received data packet was initiated by an attacker mounting a resource attack against the computing system.

The foregoing and other features and advantages of the present invention will become more apparent from the following more detailed description of particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein:

DETAILED DESCRIPTION

Figure 1:
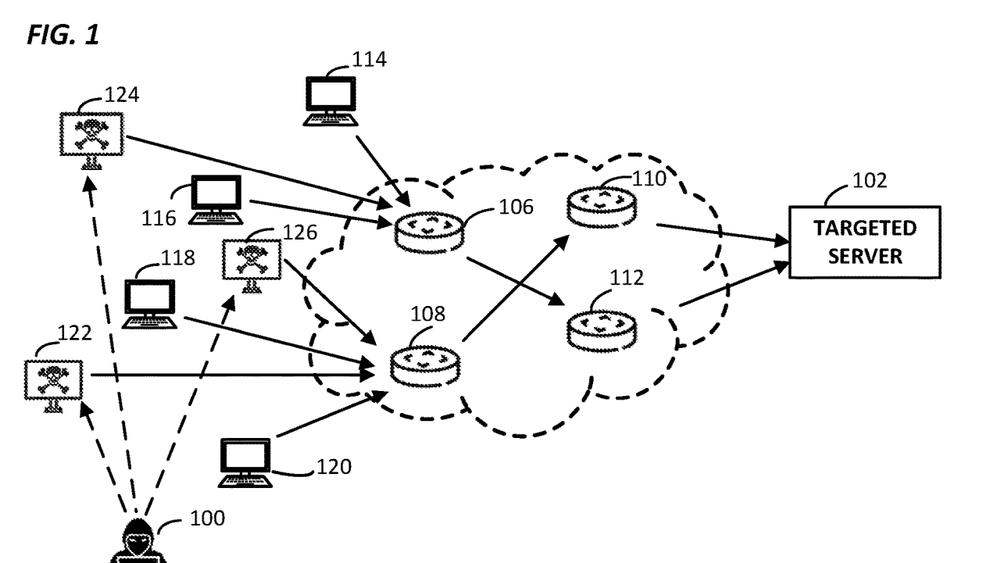
FIG. 1 is a schematic drawing illustrating how an attacker might launch an attack on a targeted web server.

In FIG. 1, a malevolent attacker computer 100 is attempting to launch a Denial of Service (DoS) attack on targeted stateful connection manager, e.g., web server 102 over the Internet 104. While item 102 is described in this example as a targeted web server, it could also be an intermediate network node, such as a proxy server, load balancer, firewall etc. Internet 104 is formed by a number of intermediary web servers 106, 108, 110 and 112 which relay data packets between targeted server 102 and a number of client computers. The client computers include legitimate client machines 114, 116, 118 and 120 which are making bona fide attempts to connect with targeted server 102. In addition, compromised client machines 122, 124 and 126, which have been infected by malware distributed by attacker computer 100, also direct data packets to targeted server 102 in an attempt to disable the resources of targeted server 102. Note that, while FIG. 1 does not show attacker computer 100 connecting directly to Internet 104, attacker computer 100 could itself directly send data packets over Internet 104 targeting server 102.

Still referring to FIG. 1, attacker 100 launches an attack via compromised nodes 122, 124 and 126 targeting victim node 102. Victim node 102 is a stateful connection manager which may, for example, be the victim server itself, or an intermediate network node such as a proxy server, load balancer, firewall, etc. In either case, the victim node 102 has a data path that processes all incoming data packets, and attacker 100 attempts to exhaust the processing resources of this data path.

Figure 2:
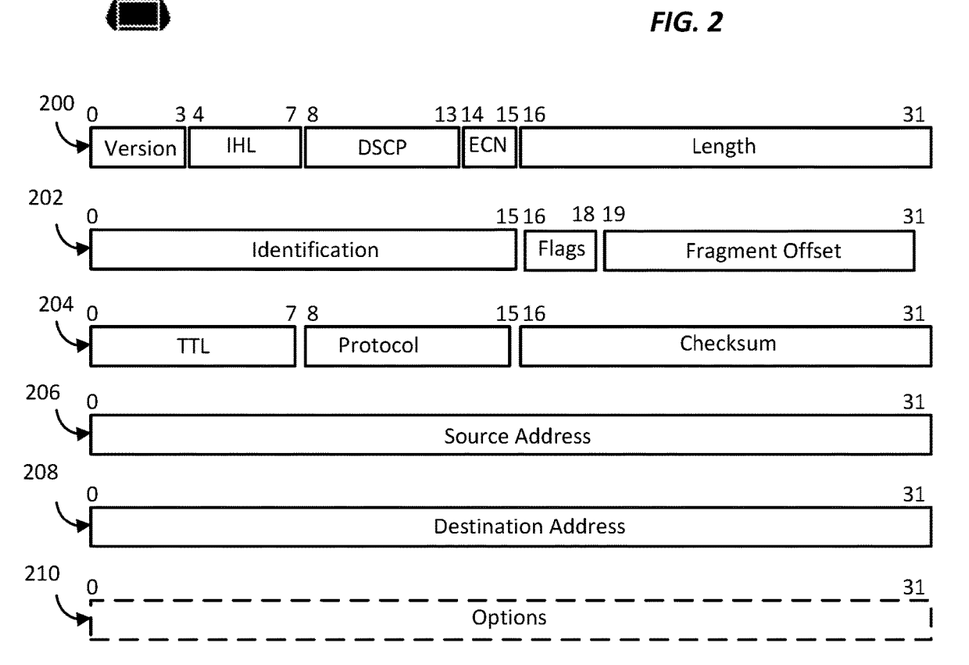
FIG. 2 is a diagram illustrating the format of a typical TCP data packet.

Before discussing the manner in which data packets are processed by various embodiments of the present invention, it may first be helpful to review the format of TCP data packets sent over computer networks. In FIG. 2, a typical configuration of an Internet Protocol (IP) data packet header is shown for IPv4 (the fourth version of the Internet Protocol). The data packet shown in FIG. 2 includes at least six 32-bit groups of data shown in the form of six 32-bit rows, namely, rows 200, 202, 204, 206, 208, and 210.

Within first row 200 of the header, the four bits of Version data provide the version number of Internet Protocol used (such as IPv4); this is always equal to 4 in the case of IPv4. The four bits of Internet Header Length (IHL) data represent the length of the IP header. The six bits of Differentiated Services Code Point (DSCP) data specifies differentiated services (DiffServ); newer technologies, e.g., Voice over IP (VoIP) used for interactive voice services, require real-time data streaming, and make use of the DSCP field. The two bits of Explicit Congestion Notification (ECN) data are an optional feature that allows for end-to-end notification of network congestion without dropping packets. The 16 bits of Length data represent the total length of the entire IP packet, including the IP header and associated data.

Within second row 202 of the header, the 16 bits of Identification data are used to identify a group of "fragments" in the IP packet. The three bits of Flags data are used to identify and control fragments. IP fragmentation is an Internet Protocol (IP) process that breaks packets into smaller pieces (fragments) that are reassembled by the receiving host. The 13 bits of Fragment Offset data specify the offset of a particular fragment relative to the beginning of the original unfragmented data packet.

Within the third row 204 of the header, the eight bits of TTL ("Time to Live") data contain a value that is impacted by the number of "hops" made by the data packet across a router. The TTL value is initially set by the requesting source computer; it can be set to any value between 1 and 255. Each time the data packet makes a "hop" across a network router, the router decrements the TTL value by one. When the TTL value reaches zero, the packet is discarded to avoid excessive "hops", and a Time Exceeded message is typically sent back to the sender. Thus, the TTL value signals to a network router whether or not the packet has been in the network too long and should be discarded. This prevents undeliverable packets from circulating forever and clogging up the networks in use. The eight bits of Protocol data define the protocol used in the data portion of the data packet. The 16 bits of Checksum data are used to error-check the header of the data packet. When a packet arrives at a router, the router calculates the checksum of the header and compares it to the checksum field; if they do not match, the data packet is dropped. Note that the checksum changes for each hop across a router, since each router decreases the TTL count.

The fourth row 206 of Source Address data represents the IPv4 address of the computer sending the request, and the fifth row 208 of Destination Address data represents the IPv4 address of the target computer. These addresses are typically written in dotted-decimal notation (e.g., 172.16.254.1) wherein each of the four digits is represented by eight bits. The Options fields shown in sixth row 210 are not commonly used, and may be omitted entirely.

Figure 3:
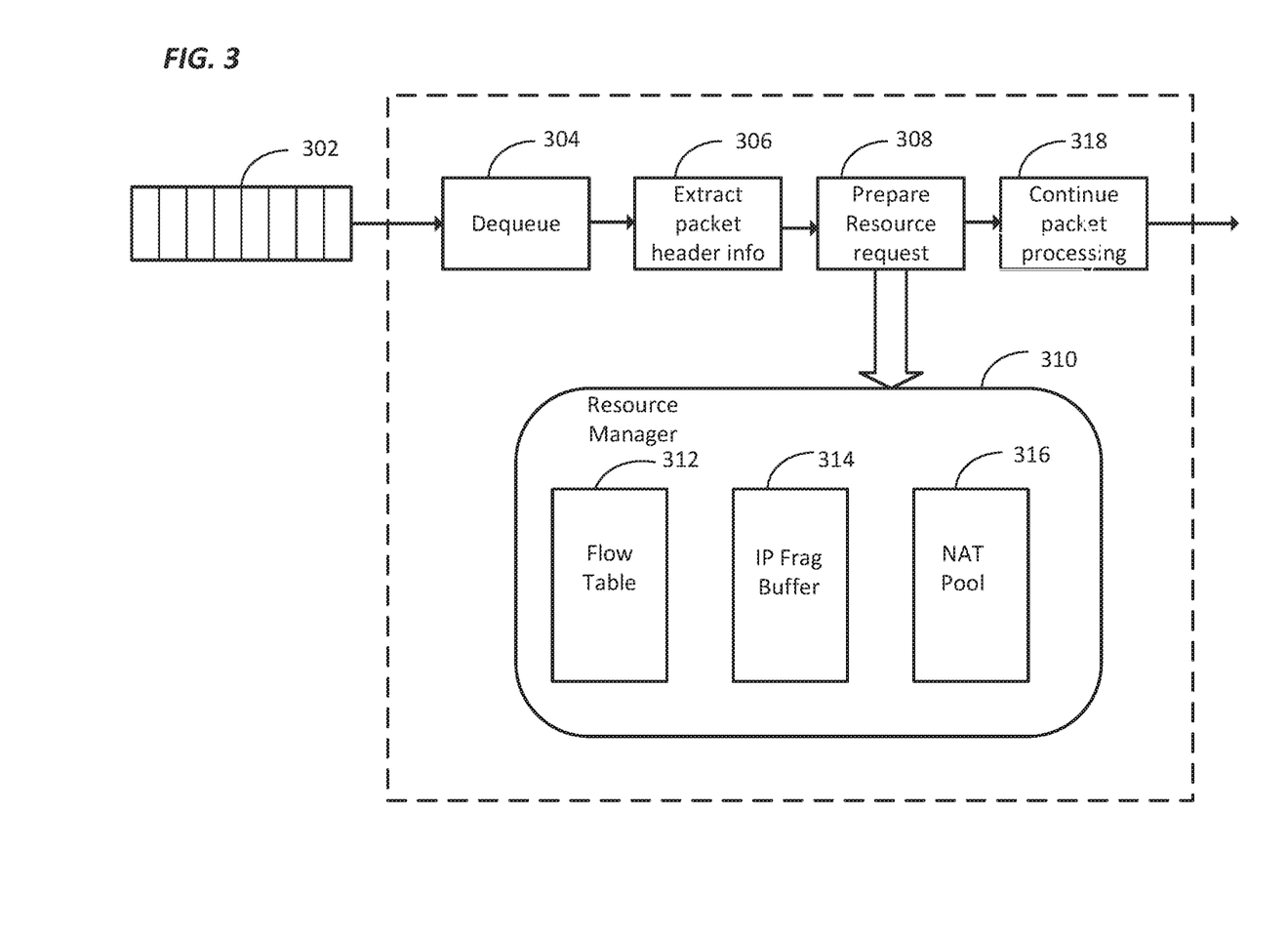
FIG. 3 is a block diagram showing a stateful connection manager and summarizing the manager in which it allocates resources to track the flow of data packets transmitted thereby.

FIG. 3 describes a data path setup for a stateful connection manager to be protected against resource exhaustion style DDoS attacks in accordance with various embodiments of the present invention. Data path 300 includes an ingress queue 302 used by processing logic of data path 300 to "dequeue" data packets for processing. Data path 300 can be implemented in hardware using network processor ASICs; an ASIC is an application-specific integrated circuit designed for a special application, such as a particular kind of transmission protocol. An example of a suitable network processor ASIC is the programmable 3850 series of Catalyst network switches available from Cisco Systems, Inc. of San Jose, Calif. Alternatively, data path 300 can be implemented in software as, for example, by using DPDK-based software switches like "vRouter" from OpenContrail (now Tungsten Fabric) or "Open vSwitch", a collaborative project of the Linux Foundation.

As shown in FIG. 3, data path 300 includes Dequeue block 304 which receives an incoming data packet from ingress queue 302. Dequeue block 304 determines that a whole packet of data (header and associated data) has been received from the ingress queue and extracts that data packet from the incoming queue of data. Extraction block 306 receives the data packet from dequeue block 304 and extracts therefrom just the header portion (see FIG. 2). The extracted header is passed from extraction block 306 to resource request block 308; based upon the contents of the header, resource request block 308 passes resource allocation requests to Resource Manager block 310. Blocks 306 and 308 may be regarded as extraction logic circuitry that is configured to receive data packets from the network and to extract metadata therefrom, including the SrcIP and TTL values from the header of each data packet.

Resource Manager block 310 includes stateful memory resources that must be allocated in order to process received data packets. As shown in FIG. 3, these resources can include, but are not limited to, 1) flow tables; 2) reassembly buffers; and 3) NAT pool tables.

Flow table 312 within Resource Manager 310 may, for example, be a TCP or UDP session flow table used to track the state of the connection to apply per TCP or UDP session policies, respectively. The TCP protocol has already been explained above; UDP, or User Datagram Protocol, is used by apps to deliver a faster stream of information by doing away with error-checking. Apart from tracking the state of the connections, flow table 312 may also be used to collect statistics and for other purposes. An entry in flow table 312 is allocated on receiving a SYN data packet (the first of the three routine handshake signals), and is de-allocated on receiving a FIN packet or an RST packet. A FIN packet indicates that the exchange of data has been completed and that the connection should be terminated. An RST packet indicates that the connection needs to be reset, as when a segment arrives which was not intended for the current connection.

Fragment buffer 314 in FIG. 3 is used by Resource Manager 310 to reassemble data fragments back in order to recreate the original data packet as received. A reassembly buffer entry is allocated in fragment buffer 314 every time a fragment belonging to a new packet arrives into the system. This entry is de-allocated when all such fragments have arrived, and the data packet can now be sent out on egress port 318.

NAT pool table 316 is a table that keeps track of NAT (Network address translation) resources. Network address translation is a method of remapping one IP address space into another by modifying network address information in the IP header of data packets while they are in transit across a network router; it is commonly used in view of the exhaustion of sufficient unique IPv4 addresses. New connections might require NAT resources, and NAT pool table 316 keeps track of available resources.

In various embodiments of the present invention, a decision is made whether or not to provide, or deny, the allocation of resources to a data packet based upon consideration of packet metadata, connection tracking statistics, and system state. In cases where a data packet significantly deviates from normal characteristics, it is more probable that related resource allocation requests will be denied in order to achieve better resource protection. This is achieved without significantly burdening the performance of the connection manager by comparison to existing methods which have been used to defend against DoS attacks.

Packet metadata considered in at least some of the embodiments of the present invention may include variables such as the packet size; the state of packet header flags; the TTL value within the packet header; the geo-location of the source IP address; the reputation score of the source IP address; and/or the results of a reverse path forwarding (RPF) check.

The packet size is the total data packet length as provided by the packet header; data packets transmitted as part of a DoS attack may include large amounts of data that require greater resources. The state of packet header flags is examined to determine whether the flag values are normal or abnormal. In regard to the TTL value within the packet header, most network devices use a large default TTL value (e.g., 128 or 255) when originating packets. Accordingly, the presence of low TTL values within legitimate data packets is unlikely. However, when an attacker mounts a DoS attack, the TTL value may initially be set to a low value, or even zero, to force a responding router to respond with an appropriate ICMP Time Exceeded exception message, which requires more computing power of the responding router. Thus, the presence of low TTL values in data packet headers may indicate that the data packet is not legitimate. Reverse path forwarding (RPF) is a method in multicast routing that helps to prevent IP address spoofing and other kinds of challenges. This method is called reverse path forwarding because, instead of looking forward to the desired destination, the router/connection manager will look back to check the reverse path of the data packet. If the reverse path check confirms that the source IP address provided was the actual source of the data packet, then it is more likely that the initiating data packet is genuine, and that it should be forwarded on to the requested destination. On the other hand, if the reverse path check is unable to confirm that the source IP address provided was the actual source of the data packet, then the data packet should be dropped.

Still referring to consideration of data packet metadata, the geo-location of the source IP address may also be considered. The data packet header includes the source IP address, and the geo-location, i.e., the geographical location of the source IP address, may be obtained by searching a look-up table indexed by the source IP address. Some countries/geographical locations are used more often than others in order to mount DoS attacks. Thus, it can be helpful to examine the country/geographical location from which a data packet originates when assessing whether the data packet is a legitimate request or part of a DoS attack. In addition, many source IP addresses have a reputation for serving as a base for distribution of malware and/or "spam". It can therefore be helpful to consider the reputation score of the source IP address when analyzing whether a data packet is a legitimate request or part of a DoS attack. Such IP address reputation scores are generally available from such providers as FireHOL [http://iplists.firehol.org/], Palo Alto [https://blog.webernetz.net/palo-alto-external-dynamic-ip-lists/], Cisco Talos [https://www.talosintelligence.com/reputation center], Spamhaus [https://www.spamhaus.org/], and VirusTotal IP reputation [https://www.virustotal.com]. Reverse path forwarding (RPF) is a method in multicast routing that helps to prevent IP address spoofing. This method is called reverse path forwarding because instead of looking forward, the router handling data packet transmission will look back to check the reverse path of the packet. If the reverse path leads back to the source IP address, then the data packet will be forwarded. If the reverse path does not lead back to the source IP address, then the data packet is most likely not legitimate and is dropped.

As mentioned above, connection tracking statistics are another factor which may be considered when assessing whether a data packet is a legitimate request or part of a DoS attack. Such connection tracking statistics include, but are not limited to, a) number of resources occupied by the source IP address; b) number of resources occupied per destination IP address; c) number of resources occupied with a given TTL value; d) the inter-packet-gap distribution over past packet arrivals, for a given source IP address (i.e., the distribution of pauses between successive network packets); and e) the packet size distribution over past packets, for a given source IP address.

System state information that may be considered when deciding whether or not to provide, or deny, the allocation of resources includes factors like a) queue size (number of data packets waiting in the queue); b) queue occupancy (i.e., the ratio of the rate at which packets are arriving compared to the rate at which packets are departing); and c) memory and processor load.

The packet metadata, connection tracking stats, and system state information described above are only indicative of malicious character to a certain extent. Individually, these factors do not identify malicious packets with 100% certainty, but each factor acts as Bayesian evidence (i.e., evidence under Bayes' theorem of statistical probability) to improve the belief or confidence level that the packet is either malicious or benign. The confidence thus obtained is used to calculate the denial probability for a resource allocation request. This results in creating a "soft" penalization method that allocates more resources to benign requestors than malicious ones. As this confidence level increases, the higher is the chance that resources will be allocated to only benign requestors. This serves the objective of making it more likely that malicious and malformed packets will be penalized rather than legitimate packets.

The same general approach may be used to calculate the "time-out" (i.e., the permitted lifetime) of already allocated resource entries, whereby suspicious entries are aged-out at a faster rate than non-suspicious ones. The result is that resources occupied by malicious actors will be freed faster as compared to legitimate data packet requests. Accordingly, it becomes more difficult for an attacker to mount a successful attack.

For example, in accordance with at least one embodiment of the present invention, a network connection manager system calculates an ageing time-out for each new connection added to the TCP connection table. The system creates a list of TCP connections, their system states, and their related packet metadata (TTL, 5-tuple, RPF check, IP reputation, GEO-lookup). For each such connection, a drop probability is calculated to reflect the probability of the connection being legitimate (i.e., coming from a non-blacklisted source; from an allowed GEO-location; and responding to challenges if required by the protocol), and normally active (i.e., not outdated, not stuck on a possibly problematic state, and not hyperactive). This ageing timeout can be calculated as:

$$\text{MaxAge}=T*(1-\text{drop\_probability}).$$

In some embodiments of the present invention, a network connection manager system selectively removes TCP connections based on the probability that they are not legitimate. The system maintains a list of TCP connections, their system states, and related packet metadata (TTL, 5-tuple, RPF check, IP reputation, GEO-lookup). For each such TCP connection, a drop probability is calculated to reflect the probability of the connection being legitimate (coming from a non-blacklisted source, from an allowed GEO-location, and responding to challenges if required by the protocol) and normally active (not outdated, not stuck on a possibly problematic state, and not hyperactive). For each incoming data packet, the drop probability is calculated to reflect the probability of the packet being malformed and/or malicious.

The network connection manager system manages its resource allocation and occupancy (memory allocation, insertion of an entry in a table) to prevent abuse and resource denial. For example, before inserting a new connection into the TCP connection table, a check is made to confirm that the connection is not being requested by a blacklisted source. An RPF check is done to ensure that each arriving data packet has arrived over a relatively short connection path and/or over essentially the same path that the router would use to forward the return packet. A check is made to ensure that the number of pending connections does not exceed a defined threshold of outstanding connections in a particular state; for example, if a large number of connections are in the "SYN-WAIT" state, this may indicate that a SYN flood attack is in progress. Also, the TTL value of the incoming data packet is checked to determine whether the same TTL value is present across a large quantity of other data packets received in a given timeframe, as this may also indicate the occurrence of an attempted attack.

Figure 4:
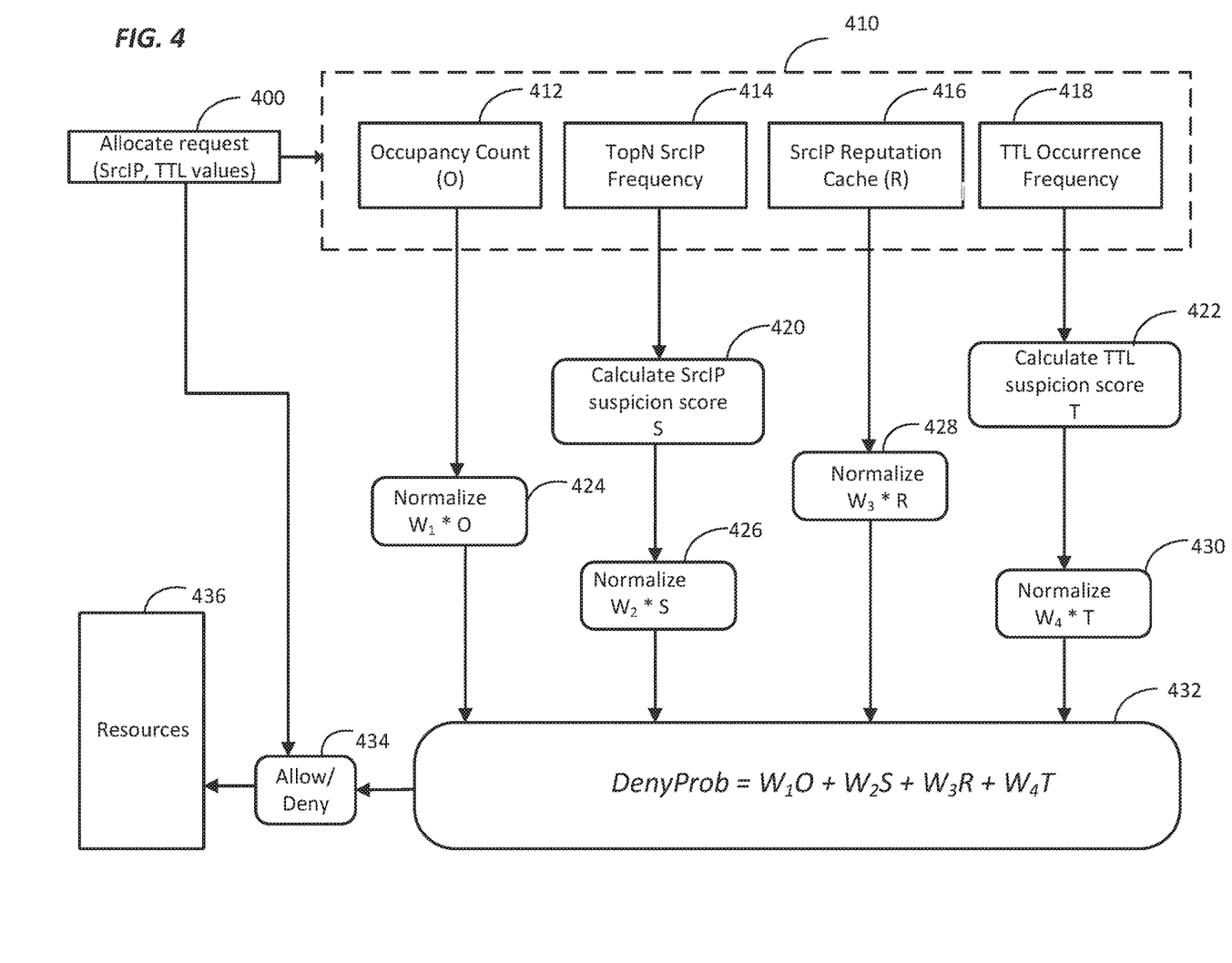
FIG. 4 is a block diagram illustrating the components of the Resource Manager shown in FIG. 3.

FIG. 4 shows a more detailed block diagram of resource manager 310 of FIG. 3. Block 400 receives a resource request from block 308 (in FIG. 3), including the source IP address (SrcIP) and Time to Live (TTL) values extracted from the header of the associated data packet. This information is provided by block 400 to dashed block 410. Block 410 includes Occupancy Count block 412, a TopN SrcIP Freq block 414, a SrcIP Reputation Cache block 416, and a TTL Occurrence Freq block 418. Each of blocks 412, 414, 416 and 418 contributes toward calculation of four corresponding suspicion scores, as explained below.

Occupancy Count block 412 maintains a count of resources currently allocated to support all active TCP connections. This count is incremented as each new resource is allocated, and is decremented as each allocated resource is de-allocated to free-up space. This count could be a grand total for all of the various types of resources used to manage data packet requests, or separate subtotals may be maintained for different types of resources (e.g., reassembly buffers; TCP/UDP session flow tables; NAT Pool tables; etc.).

Alternatively, occupancy counting could be tracked according to the TTL value in the data packet header. To track resource occupancy by TTL value, a total of 255 counters are used, as there are 256 possible TTL values ranging from 0 to 255, and no requests from data packets having a TTL value of zero would have been accepted. Each of the 255 counters serves to count the number of resources occupied by packets having TTL values of 1, 2, 3 and so on, until 255.

Other occupancy counting options may be employed. For example, resource occupancy may be tracked by counting resources occupied for each different SrcIP address. However, this can become impractical because there are theoretically millions of possible SrcIP addresses. Accordingly, a more efficient counting technique may be used, such as the so-called "Count Min Sketch" data structure technique described in the paper entitled "An Improved Data Stream Summary: The Count-Min Sketch and its Applications" by Cormode and Muthukrishnan, *J. Algorithms*. 55: 29-38 (2005), the disclosure of which is hereby incorporated by reference. While this technique uses approximation, exact counts are not required in this context, and hence, approximate counting is acceptable to save memory. The general goal of counting occupied resources based upon SrcIP addresses is to penalize data packets that contain particular SrcIP addresses that are noted to be using higher resource occupancy counts than other data packets. Occupancy counting by SrcIP address can be assisted by the information stored by block 414, discussed below, which tracks the frequency of particular SrcIP addresses within processed data packets.

TopN SrcIP Freq block 414 maintains a set of the most frequent, or top N (where N is a real number, e.g. 100, or 1,000), source IP addresses, as determined by current occupancy of data packets in process. Block 414 leads to block 420 wherein a SrcIP suspicion score is calculated. If the SrcIP of the current data packet matches one of the Top N SrcIP addresses tracked by block 414, then block 420 assigns a higher suspicion score to the current data packet as compared with data packets using less-frequent SrcIP addresses. The resulting suspicion score will be proportionally higher as the percentage occupancy by a particular SrcIP address increases.

The SrcIP reputation cache block 416 stores a series of source IP addresses having a reputation for serving as a base for distribution of malware and/or "spam". If a particular source IP address has a reputation for being malevolent, then block 416 provides a score having a higher value. As explained below, this higher value will increase the probability that resources will be denied to corresponding data packets.

The TTL Occurrence Freq block 418 tracks the frequency with which relatively low TTL values are included in headers of data packets in process. For example, if 25 recent data packets each include a TTL value of 3 or less, this likely indicates that such data packets are not legitimate requests, but rather part of a DoS attack. Block 418 leads into block 422, wherein a TTL suspicion score is calculated for the current data packet. As the occurrence of such low TTL values increases, the calculated suspicion score increases, and this higher value will increase the probability that resources will be denied to data packets having corresponding low value TTLs.

Still referring to FIG. 4, blocks 412, 420, 416 and 422 provide information for generating four suspicion scores that may be considered when deciding whether or not to allocate resources for an incoming data packet that is requesting such resources. These four suspicion scores may be combined with each other to arrive at a multi-factored indicator of whether additional resources should be allocated or denied. However, before calculating a weighted sum of such suspicion scores, it is advantageous to first normalize the individual suspicion scores to a comparable scale. For example, the SrcIP address reputation score provided by block 416 might be a value ranging between 1 and 10, but other suspicion scores, e.g., occupancy count, might have a value ranging between 1 and 100,000. Accordingly, each of the raw suspicion scores provided by blocks 412, 420, 416 and 422 is normalized by blocks 424, 426, 428, and 430, respectively. In block 424, the raw occupancy count O is multiplied by constant $W_1$ to provide the scaled value $W_1*O$. In block 426, the SrcIP suspicion score S is multiplied by constant $W_2$ to provide the scaled value $W_2*S$. Block 428 takes the raw SrcIP address reputation score R and multiplies it by constant $W_3$ to provide the scaled value $W_3*R$. Likewise, block 430 multiplies the raw TTL suspicion score by constant $W_4$ to provide the scaled value $W_4*T$. The scaling factors $W_1$, $W_2$, $W_3$, and $W_4$ are each preferably selected to be a power of 2 (i.e., 2, 4, 8, 16, 32, 64, 128, 256, etc.) for quick multiplication. The normalized scores output by blocks 424, 426, 428 and 430 are comparable to each other for low suspicion instances, and are also comparable to each other for high suspicion cases.

Still referring to FIG. 4, the normalized scores output by blocks 424, 426, 428 and 430 are provided to summer block 432 and added together to provide the value DenyProb. This value is provided to decision logic block 434 and compared to a threshold value (X). If DenyProb exceeds threshold value X, then a decision is made to deny the allocation of resources needed to process the current data packet, and the data packet is dropped. On the other hand, if DenyProb does not exceed threshold value X, then a decision is made to allocate the resources needed to process the current data packet.

Figure 5:
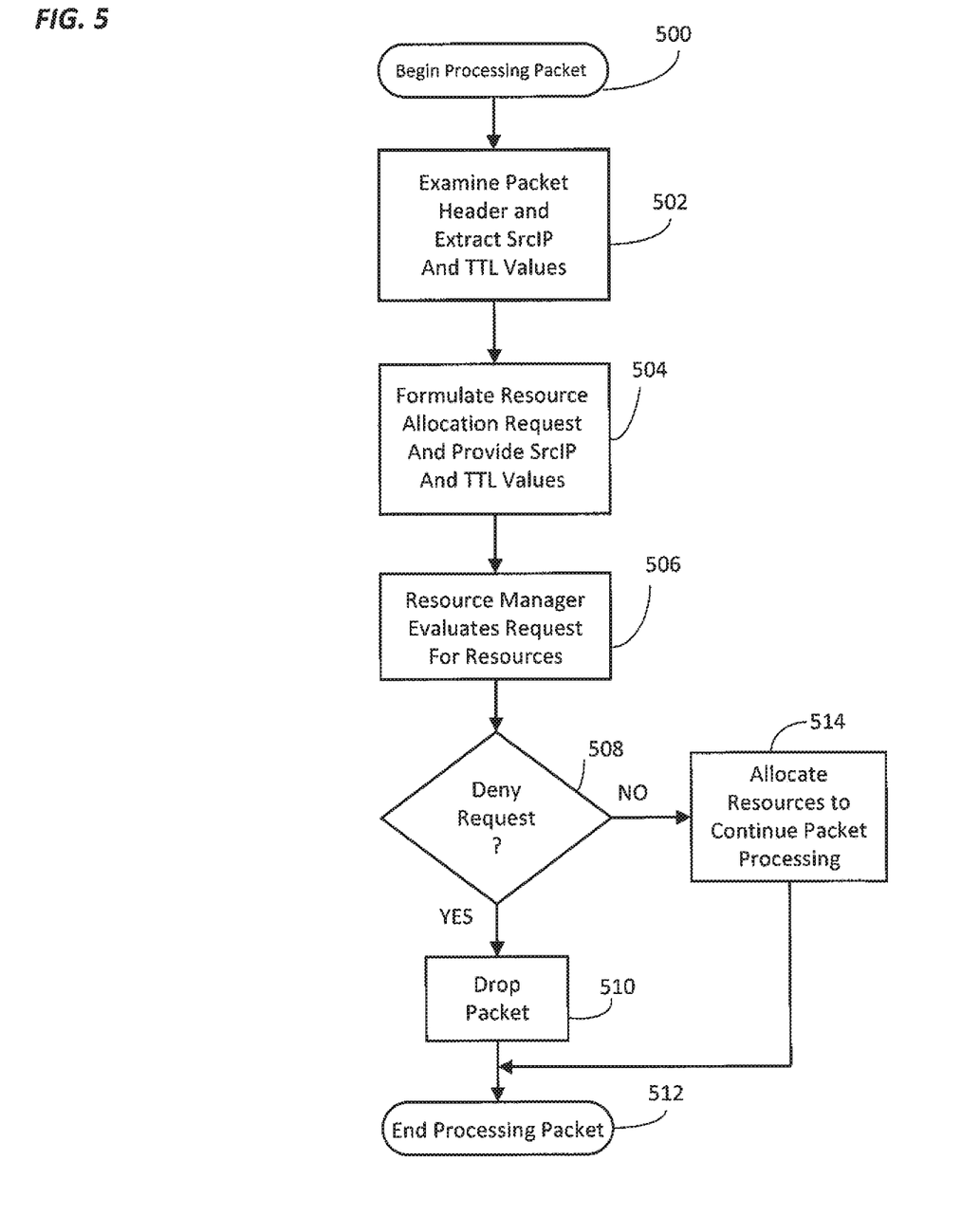
FIG. 5 is a high-level flow chart showing steps performed to process a data packet in accordance with various embodiments of the invention.
Figure 6:
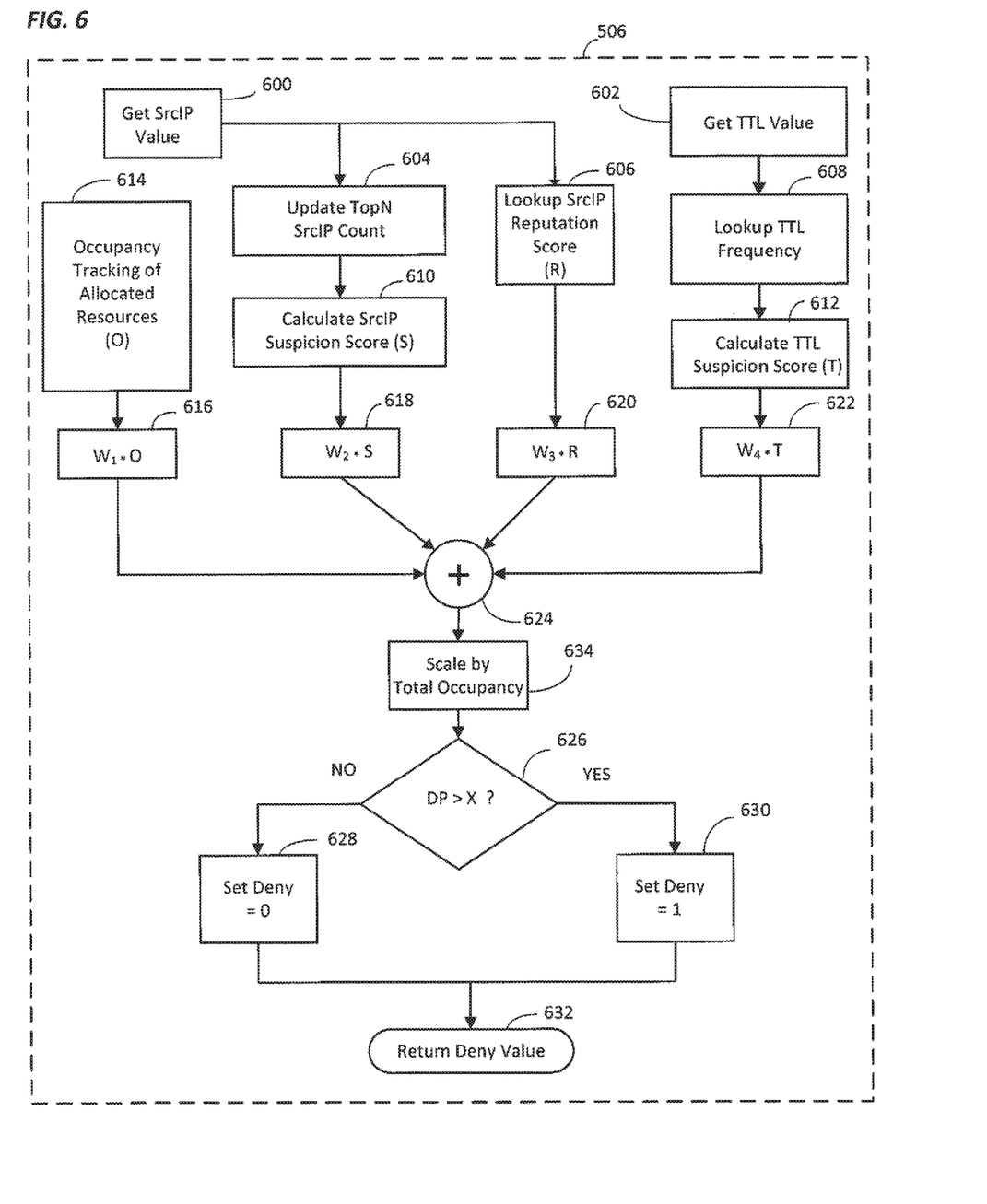
FIG. 6 is a more detailed flow chart showing steps performed to compute a suspicion score for deciding whether or not to deny resources to an incoming data packet.

The flowcharts of FIGS. 5 and 6 illustrate the steps of a method performed in accordance with various embodiments of the invention to process incoming data packets. These are the steps taken by the resource manager to determine whether resources will be allocated or not, based upon various suspicion scores. Since the method described herein relies on simple table lookups and basic computation steps, the described method avoids high computer processor loads and significant memory storage costs.

Referring to FIG. 5, the flow of the method begins with start block 500 where processing of a new data packet begins. At step 502, the header of the data packet is examined, and the values for the source IP address (SrcIP) and Time to Live (TTL) are extracted; other data in the header, such as total packet length, may also be considered to determine the extent of resources that will be required to process the current data packet, assuming that it is not dropped. Flow then passes to step 504 where a resource allocation request is formulated, along with the SrcIP and TTL values.

Still referring to FIG. 5, step 506 is shown in summary form and represents the steps performed by the resource manager to determine whether resources will be allocated or not. A more detailed explanation of step 506 will be described below in conjunction with FIG. 6. Step 506 generates a binary value ("0" or "1"), wherein, for example, a "0" value means that resources will be allocated, and a "1" value means that resources will be denied. Flow then passes to decision step 508. If it has been decided to deny the request for resources, then flow proceeds to step 510, and the data packet is dropped; processing of the current data packet is completed, as indicated by step 512. On the other hand, if a decision was made to allocate resources, then flow passes from decision step 508 to step 514 for allocating required resources to the current data packet; processing of the current data packet is then completed, as indicated by step 512.

Turning now to FIG. 6, the details of the steps performed at step 506 of FIG. 5 are explained in greater detail. Step 600 represents the step of obtaining the SrcIP address provided at step 504. Similarly, step 602 represents obtaining the TTL value provided at step 504.

At step 604, the current SrcIP address is compared with the most frequent SrcIP addresses of recent data packets, and if there is a match, then the count for that SrcIP address is incremented. If there is no match, then a new counter is created for the new SrcIP address and set to a count of 1. Control then flows from step 604 to step 610, at which suspicion score S is created, as by checking a lookup table, based upon the frequency of requests from the current SrcIP address.

If desired, steps 604 and 610 can be modified to include a "Geo-Location" score. The term "geo-location" is used to identify the part of the world from which the data packet originated. Using the SrcIP address as a key, a lookup table can be searched to determine the corresponding country/region. As already noted, those launching a DoS attack may sometimes use "spoofed" SrcIP addresses to incorrectly identify the source of the data packet, and if so, then this "geo-location" score will not be as effective. However, if the attacker does not spoof the SrcIP address, then it is possible to determine the country/region from which the data packet was sent. There are several commercially available, open-source, geo-location databases that can be used for this purpose, e.g., IP2Location™-Lite available from IP2Location.com of Pulau Pinang, Malaysia. Certain geo-location regions are notorious for being used to launch DDoS attacks, and data packets originating from those geo-location regions can be assigned a higher suspicion score to reflect added risk. Such risk is increased if the connection manager being protected is receiving a relatively large number of data packets from a suspect geo-location. Thus, by combining geo-location source with the frequency of data packets originating from such source, malicious traffic can be rejected earlier on, without penalizing benign requests originating from suspect geo-locations.

At step 606, the SrcIP address is used to lookup a reputation score R. This reputation score relates to the reputation of the particular SrcIP address within the data packet header, irrespective of the corresponding geo-location. DoS attacks are sometimes launched from geo-locations from which requests are usually legitimate. Accordingly, reliance only upon geo-location of the source of the data packet is often insufficient. Using the SrcIP address as a key, a table lookup is performed to determine the on-line reputation of this particular SrcIP address. As already noted, commercially available reputation lists are available from FireHOL, Palo Alto, Cisco Talos, Spamhaus and VirusTotal IP.

Step 608 in FIG. 6 compares the current TTL value to the various TTL values for data packets that have recently been received. For example, if the current TTL value is 5, then the counter for TTL values of 5 is incremented. At step 612, the current TTL value, and the frequency with which such TTL value has appeared in recent data packets, are used to calculate a suspicion score T. In general, high TTL values result in lower suspicion scores than low TTL values. Also, lower TTL values that appear frequently result in even higher suspicion scores. If a relatively large number of data packets are received with the same TTL value and the same geo-location, there is a higher than normal probability that these packets have spoofed SrcIP addresses, and are being sent by an attacker, even if the SrcIP addresses of such data packets are not identical to each other.

At step 614 of FIG. 6, resource occupancy is tracked on a real-time basis. This tracking may be performed in several ways. For example, a total of resources occupied may be maintained. This is measured by maintaining a single counter accounting for all resources being used to process data packets; the count maintained by such counter is incremented on allocation of each resource, and decremented on de-allocation of each such resource. Secondly, resource occupancy percentage may be indexed by corresponding TTL value. If a large percentage of resources are occupied by data packets having the same TTL value, then further requests presenting this same TTL value will result in higher occupancy suspicion scores O. Thirdly, resource occupancy may be tracked according to associated SrcIP source IP address; as already noted, there are a large number of possible unique SrcIP addresses, so the count_min_sketch technique (described above) may be used to avoid huge memory costs.

Assuming that resource occupancy is being tracked by SrcIP address, step 614 might generate, as a raw suspicion score, the percentage of total resources currently being occupied by data packets having the same SrcIP address as the current data packet. For example, if the current data packet has a SrcIP address that is the same as other data packets that currently occupy 70% of the total resources being managed by the resource manager, then a raw suspicion score O of "70" is provided. Thus, the higher the occupancy of resources by a particular SrcIP address, the higher is the suspicion score for the current data packet using the same SrcIP address.

It should be noted that certain network elements, such as proxies, there may be cases wherein a benign SrcIP address may legitimately occupy a relatively large percentage of resources; one such example is a SrcIP address belonging to a CGNAT, or Carrier-grade NAT. A CGNAT might be a connection manager located at an end site, e.g., a residential network configured with private network addresses that are translated to public IPv4 addresses by a network address translator device, permitting small pools of public addresses to be shared among many end sites. These CGNATs can result in the frequent appearance of a particular SrcIP address even though the related requests are legitimate. The resource manager can be configured to "learn", from past usage history, that certain SrcIP addresses are benign even though they are associated with relatively higher occupancy rates. In these cases, the suspicion score O can be nudged lower than the actual occupancy percentage value, for a given SrcIP address, to avoid penalizing benign "heavy hitters".

Steps 616, 618, 620, and 622 represent the steps of multiplying the raw suspicion scores O, S, R and T by weighting factors $W_1$, $W_2$, $W_3$, and $W_4$ for the reasons already explained above. These weighted suspicion scores are then summed together in adding step 624 to provide the overall DenyProbability score DP. Optional step 634 allows for scaling of the DP score in accordance with the percentage of total occupied resources; in other words, if the total of occupied resources is near 100%, then the raw DP score provided by step 624 is not scaled at all. On the other hand, if the total of occupied resources is at a relatively low percentage, then the raw DP score can be scaled lower.

There are different ways that the DP score described herein can be used to help protect the resources of a computing device, e.g., a network router. In one case, the computed DP score is simply compared to a threshold value ("X"). FIG. 6 illustrates this case at decision step 626, wherein the resulting DP score is compared to threshold value X. If the DP score exceeds threshold X, then the Deny variable is set to binary value "0", and flow passes to Return Deny Value step 632. Alternatively, if the DP score exceeds threshold value X, then the data packet presents an excessive risk, the Deny variable is set to binary Value "1", and flow passes to Return Deny Value step 632. As indicated in FIG. 5, control then flows to decision step 508.

In an alternate case, data packets are dropped in a partially-randomized manner while nonetheless dropping more data packets having higher DP scores than those having lower DP scores. In this case, suppose that the DP score normalization weights are selected such that the DP score value ranges between 0 and 1.0, where a zero value represents a very low likelihood of a malevolent data packet, and 1.0 represents a very high likelihood of a malevolent data packet. As each data packet is analyzed, a random number generator is used to provide a random decimal number ("Y") that also ranges between 0 and 1.0. Referring briefly to FIG. 4, Allow/Deny block 434 compares random number Y to the DP value; if Y is less than the DP value, then resources are allowed to be allocated, but if Y is equal to or greater than DP, then no resources are allocated and the data packet is dropped. This scheme will cause some relatively low risk data packets to be dropped, and will also allow some relatively high risk data packets to allocate resources. On the other hand, on average, high risk data packets will be dropped more often than low risk data packets will be dropped. Moreover, the dropping percentage of higher risk data packets (i.e., those having higher DP values) will increase linearly with the DP value.

As an example of the partially random denial of resources described just above, suppose that 3,000 incoming data packets are split evenly (1,000 each) among three types characterized in Table I below:

TABLE I

| Type | Number of this Type | DP Value | SrcIP Occupancy | Reputation Score | Data Packets Dropped |
|---|---|---|---|---|---|
| A | 1,000 | 0 | Very low | Very good | 0 |
| B | 1,000 | 0.20 | High | Good | 200 |
| C | 1,000 | 0.90 | High | Bad | 900 |

Using the partially-random selection method described above when processing the packets shown in Table I above, 200 packets of Type B would be dropped, and 900 packets of Type C would be dropped. None of the Type A packets would be dropped. Thus, higher risk Type C packets would be dropped much more frequently than those of Type B, even though 100 Type C packets would be accepted and have resources being allocated thereto for every 1,000 Type C packets processed. Because even a high DP score does not guarantee with 100% certainty that the packet is from an attacker, it may be best in many cases not to apply a hard decision boundary, or threshold, beyond which all packets are dropped. For example, In the case of Table I above, if the threshold was selected to be 0.80 (or 80%), then none of the Type B packets would have been dropped, but all of the Type C packets would have been dropped. By randomly selecting packets to be dropped (albeit with a higher percentage for high DP scores), this scheme achieves the effect of statistically dropping more malicious packets than benign packets. Thus, the allocation of the resources of the computing system is decreased overall when as the probability increases that such data packets were initiated by an attacker mounting a denial of service attack against the computing system.

Whether one uses a fixed threshold comparison or a partially-random selection method, it must be kept in mind that no packet dropping may be required if the resources of the computing system are not yet threatened. For example, in the case of data packets having DP scores of 20% (0.20)

due to bad reputation but relatively low SrcIP occupancy, one might choose not to drop any of such data packets at all. It is really only when there is a threat of resource exhaustion that dropping of data packets may be required.

In the specific case of a TCP "out-of-order" packet DoS attack already described above, the SrcIP address is still a very important factor when assessing whether to allocate, or maintain, buffer resources within a network router. In the case of a TCP out-of-order packet DoS attack, a data packet using a SrcIP address with a poor reputation score (R) increases the probability that resources will be denied. Likewise, if a large number of data packets are coming in from a common SrcIP address, that will also increase the probability that further resource allocations will be denied for packets using that SrcIP address. TTL occurrence frequency will have lesser significance in the case of a TCP out-of-order packet DoS attack as compared with a TCP SYN flood attack, for example. Finally, in the case of a TCP "out-of-order" packet DoS attack, the occupancy count analysis described above will help reduce the probability of additional resources being allocated to buffer such data packet segments, particularly if occupancy is being tracked/indexed by SrcIP address.

We calculate the deny probability and instead of comparing it with any threshold, we actually deny those number of requests. For example, if deny probability for a given packet was 0.2, we would deny this with a 20% chance. This is done by drawing a random number between 0 and 1 and comparing it with the calculated denyProb. This way, we randomly end up choosing more malicious packets than benign packets over time.

Computing systems referred to herein can comprise an integrated circuit, a microprocessor, a personal computer, a server, a distributed computing system, a communication device, a network device, a firewall, a proxy server, a web server, an application gateway, a stateful connection manager, and/or various combinations of the same. Processors referred to herein can comprise microprocessors, for example. Chipsets referred to herein can comprise one or more integrated circuits, and memories and storage referred to herein can comprise volatile and/or non-volatile memory such as random access memory (RAM), dynamic random access memory (DRAM), static random access memory (SRAM), magnetic media, optical media, nano-media, a hard drive, a compact disk, a digital versatile disc (DVD), and/or other devices configured for storing analog or digital information, such as in a database. As such, it will be appreciated that the various examples of logic noted above can comprise hardware, firmware, or software stored on a computer-readable medium, or combinations thereof.

The various examples of logic noted herein can comprise hardware, firmware, or software stored on a computer-readable medium, or combinations thereof. This logic may be implemented in an electronic device to produce a special purpose computing system. Computer-implemented steps of the methods noted herein can comprise a set of instructions stored on a computer-readable medium that when executed cause the computing system to perform the steps. A computer-readable medium, as used herein, refers only to non-transitory media, does not encompass transitory forms of signal transmission, and expressly excludes paper.

A computing system programmed to perform particular functions pursuant to instructions from program software is a special purpose computing system for performing those particular functions. Data that is manipulated by a special purpose computing system while performing those particular functions is at least electronically saved in buffers of the computing system, physically changing the special purpose computing system from one state to the next with each change to the stored data. Claims directed to methods herein are expressly limited to computer implemented embodiments thereof and expressly do not cover embodiments that can be performed purely mentally.

The absence of the term "means" from any claim should be understood as excluding that claim from being interpreted under Section 112(f) of the Patent Laws. As used in the claims of this application, "configured to" and "configured for" are not intended to invoke Section 112(f) of the Patent Laws.

Several embodiments are specifically illustrated and/or described herein to exemplify particular applications of the invention. These descriptions and drawings should not be considered in a limiting sense, as it is understood that the present invention is in no way limited to only the disclosed embodiments. It will be appreciated that various modifications or adaptations of the methods and or specific structures described herein may become apparent to those skilled in the art. All such modifications, adaptations, or variations are considered to be within the spirit and scope of the present invention, and within the scope of the appended claims.

We claim:

1. A computing system for coupling to a computer network, the computing system having resources for processing data packets received from the computer network, the data packets having headers that include a source IP address value SrcIP and a Time to Live value TTL, the computing system comprising traffic management apparatuses, client devices, or server devices, the computing system comprising memory comprising programmed instructions stored thereon and processors configured to be capable of executing the stored programmed instructions to:

receive data packets from the network and configured to extract the SrcIP and TTL values from the header of each data packet;

analyze the extracted SrcIP and TTL values to determine the probability that a received data packet was initiated by an attacker mounting a resource attack against the computing system by monitoring the amount of resources already allocated for processing received data packets that have a particular SrcIP value, and increasing the probability that a received data packet was initiated by an attacker mounting a resource attack against the computing system as the amount of resources already allocated for processing received data packets having the particular SrcIP value increases; and in response to the analyzing the extracted SrcIP and TTL values, decrease the allocation of the resources of the computing system used to process a data packet as the probability that the data packet was initiated by an attacker mounting a resource attack against the computing system increases.

2. The computing system of claim 1 wherein the processors are further configured to be capable of executing the programmed instructions stored in the memory to:

use the SrcIP value to look up a corresponding reputation score in a SrcIP address reputation database, and wherein the reputation score is used by the processors when determining the probability that a received data packet was initiated by an attacker mounting a resource attack against the computing system.

3. The computing system of claim 1 wherein the processors are further configured to be capable of executing the programmed instructions stored in the memory to:
   use the SrcIP value to look up a corresponding geo-location from which the received data packet was purportedly sent, and wherein the processors are further configured to
   increase the probability that a received data packet was initiated by an attacker mounting a resource attack against the computing system when the corresponding geo-location is a country or region from which resource attacks are frequently mounted.

4. The computing system of claim 3 wherein the processors are further configured to be capable of executing the programmed instructions stored in the memory to is configured to:
   monitor the amount of resources already allocated for processing received data packets that originate from a particular geo-location, and wherein the processors are further configured to
   increase the probability that a received data packet was initiated by an attacker mounting a resource attack against the computing system as the amount of resources already allocated for processing received data packets that originated from said geo-location increases.

5. The computing system of claim 1 wherein the processors are further configured to be capable of executing the programmed instructions stored in the memory to:
   use the SrcIP value to look up a corresponding reputation score in a SrcIP address reputation database;
   count the number of data packets received which have a particular TTL value, and wherein the processors are further configured to compute a TTL suspicion score derived from the number of data packets received which have the particular TTL value;
   monitor the frequency of data packets received which have a particular SrcIP value, and wherein the processors are further configured to compute an SrcIP suspicion score derived from the frequency of received data packets having the particular SrcIP value;
   monitor the amount of resources already allocated, and wherein the processors are further configured to provide a corresponding occupancy count;
   scale the reputation score, TTL suspicion score, the SrcIP suspicion score, and the occupancy count by weighted scaling factors; and
   add together the scaled reputation score, scaled TTL suspicion score, scaled SrcIP suspicion score, and scaled occupancy count, to provide the probability that a received data packet was initiated by an attacker mounting a resource attack against the computing system.

6. A method implemented by one or more computer systems, server devices, or client devices, for protecting a computing system coupled to a computer network from a resource attack by penalizing suspicious data packets without significantly penalizing legitimate data packets, the computing system having resources for processing data packets received from the computer network, the data packets having headers that include a source IP address value SrcIP and a Time to Live value TTL, the method comprising steps of:
   extracting the SrcIP and TTL values from the header of each received data packet;
   analyzing the extracted SrcIP and TTL values to determine the probability that a received data packet was initiated by an attacker mounting a resource attack against the computing system by monitoring the amount of resources already allocated for processing received data packets that have a particular SrcIP value, and increasing the probability that a received data packet was initiated by an attacker mounting a resource attack against the computing system as the amount of resources already allocated for processing received data packets having the particular SrcIP value increases; and
   selectively denying the allocation of the resources of the computing system used to process a data packet as the probability that the data packet was initiated by an attacker mounting a resource attack against the computing system increases.

7. The method of claim 6, wherein the analyzing step further comprises using the SrcIP value to look up a corresponding reputation score in a SrcIP address reputation database, and wherein the reputation score is used when determining the probability that a received data packet was initiated by an attacker mounting a resource attack against the computing system.

8. The method of claim 6, wherein the analyzing step further comprises:
   looking up a geo-location from which the received data packet was purportedly sent as based upon the extracted SrcIP value; and
   increasing the probability that a received data packet was initiated by an attacker mounting a resource attack against the computing system when the corresponding geo-location is a country or region from which resource attacks are frequently mounted.

9. The method of claim 8, wherein the analyzing step further comprises:
   monitoring the amount of resources already allocated for processing received data packets that originate from a particular geo-location, and wherein the analyzing step increases the probability that a received data packet was initiated by an attacker mounting a resource attack against the computing system as the amount of resources already allocated for processing received data packets that originated from said geo-location increases.

10. The method of claim 6, wherein the analyzing step further comprises:
    using the SrcIP value to look up a corresponding reputation score in a SrcIP address reputation database;
    counting the number of data packets received which have a particular TTL value, and computing a TTL suspicion score derived from the number of data packets received which have the particular TTL value;
    monitoring the frequency of data packets received which have a particular SrcIP value, and computing an SrcIP suspicion score derived from the frequency of received data packets having the particular SrcIP value;
    monitoring the amount of resources already allocated, and providing a corresponding occupancy count;
    scaling the reputation score, the TTL suspicion score, the SrcIP suspicion score, and the occupancy count, by weighted scaling factors; and
    adding together the scaled reputation score, the scaled TTL suspicion score, the scaled SrcIP suspicion score, and the scaled occupancy count, to provide the probability that a received data packet was initiated by an attacker mounting a resource attack against the computing system.

11. An apparatus, comprising memory comprising programmed instructions stored in the memory and processors configured to be capable of executing the programmed instructions stored in the memory to:
- receive data packets from the network and configured to extract the SrcIP and TTL values from the header of each data packet;
- analyze the extracted SrcIP and TTL values to determine the probability that a received data packet was initiated by an attacker mounting a resource attack against the computing system by monitoring the amount of resources already allocated for processing received data packets that have a particular SrcIP value, and increasing the probability that a received data packet was initiated by an attacker mounting a resource attack against the computing system as the amount of resources already allocated for processing received data packets having the particular SrcIP value increases; and
- responsive to analyzing the extracted SrcIP and TTL values, decrease the allocation of the resources of the computing system used to process a data packet as the probability that the data packet was initiated by an attacker mounting a resource attack against the computing system increases.

12. The device as set forth in claim 11, wherein the processors are further configured to be capable of executing the programmed instructions stored in the memory to:
- use the SrcIP value to look up a corresponding reputation score in a SrcIP address reputation database, and
- use the reputation score when determining the probability that a received data packet was initiated by an attacker mounting a resource attack against the computing system.

13. The device as set forth in claim 11, wherein the processors are further configured to be capable of executing the programmed instructions stored in the memory to:
- use the SrcIP value to look up a corresponding geo-location from which the received data packet was purportedly sent, and
- increase the probability that a received data packet was initiated by an attacker mounting a resource attack against the computing system when the corresponding geo-location is a country or region from which resource attacks are frequently mounted.

14. The device as set forth in claim 13, wherein the processors are further configured to be capable of executing the programmed instructions stored in the memory to:
- monitor the amount of resources already allocated for processing received data packets that originate from a particular geo-location, and
- increase the probability that a received data packet was initiated by an attacker mounting a resource attack against the computing system as the amount of resources already allocated for processing received data packets that originated from said geo-location increases.

15. The device as set forth in claim 11, wherein the processors are further configured to be capable of executing the programmed instructions stored in the memory to:
- use the SrcIP value to look up a corresponding reputation score in a SrcIP address reputation database;
- count the number of data packets received which have a particular TTL value, and compute a TTL suspicion score derived from the number of data packets received which have the particular TTL value;
- monitor the frequency of data packets received which have a particular SrcIP value, and wherein the processors are further configured to compute an SrcIP suspicion score derived from the frequency of received data packets having the particular SrcIP value;
- monitor the amount of resources already allocated, and provide a corresponding occupancy count;
- scale the reputation score, TTL suspicion score, the SrcIP suspicion score, and the occupancy count by weighted scaling factors; and
- add together the scaled reputation score, scaled TTL suspicion score, scaled SrcIP suspicion score, and scaled occupancy count, to provide the probability that a received data packet was initiated by an attacker mounting a resource attack against the computing system.

16. A non-transitory computer readable medium having stored thereon instructions for managing servers comprising executable code which when executed by processors, causes the processors to:
- receive data packets from the network and configured to extract the SrcIP and TTL values from the header of each data packet;
- analyze the extracted SrcIP and TTL values to determine the probability that a received data packet was initiated by an attacker mounting a resource attack against the computing system by monitoring the amount of resources already allocated for processing received data packets that have a particular SrcIP value, and increasing the probability that a received data packet was initiated by an attacker mounting a resource attack against the computing system as the amount of resources already allocated for processing received data packets having the particular SrcIP value increases; and
- responsive to analyzing the extracted SrcIP and TTL values, decrease the allocation of the resources of the computing system used to process a data packet as the probability that the data packet was initiated by an attacker mounting a resource attack against the computing system increases.

17. The medium of claim 16, wherein the executable code which when executed by the processors, further causes the processors to:
- use the SrcIP value to look up a corresponding reputation score in a SrcIP address reputation database, and
- use the reputation score when determining the probability that a received data packet was initiated by an attacker mounting a resource attack against the computing system.

18. The medium of claim 16, wherein the executable code which when executed by the processors, further causes the processors to:
- use the SrcIP value to look up a corresponding geo-location from which the received data packet was purportedly sent, and
- increase the probability that a received data packet was initiated by an attacker mounting a resource attack against the computing system when the corresponding geo-location is a country or region from which resource attacks are frequently mounted.

19. The medium of claim 18, wherein the executable code which when executed by the processors, further causes the processors to:
- monitor the amount of resources already allocated for processing received data packets that originate from a particular geo-location, and increase the probability that a received data packet was initiated by an attacker mounting a resource attack against the computing system as the amount of resources already allocated for processing received data packets that originated from said geo-location increases.

20. The medium of claim 16, wherein the executable code which when executed by the processors, further causes the processors to:
use the SrcIP value to look up a corresponding reputation score in a SrcIP address reputation database;
count the number of data packets received which have a particular TTL value, and compute a TTL suspicion score derived from the number of data packets received which have the particular TTL value;
monitor the frequency of data packets received which have a particular SrcIP value, and wherein the processors are further configured to compute an SrcIP suspicion score derived from the frequency of received data packets having the particular SrcIP value;
monitor the amount of resources already allocated, and provide a corresponding occupancy count;
scale the reputation score, TTL suspicion score, the SrcIP suspicion score, and the occupancy count by weighted scaling factors; and
add together the scaled reputation score, scaled TTL suspicion score, scaled SrcIP suspicion score, and scaled occupancy count, to provide the probability that a received data packet was initiated by an attacker mounting a resource attack against the computing system.

* * * * *